United States Patent [19]

Erb et al.

[11] 4,022,943
[45] May 10, 1977

[54] SHEET TYPE COVERING MATERIAL WITH METALLIC LUSTER AND PROCESS FOR MAKING SAME

[75] Inventors: Edward R. Erb, East Greenville; Kenneth J. Faust, Orwigsburg, both of Pa.

[73] Assignee: GAF Corporation, New York, N.Y.

[22] Filed: Aug. 5, 1976

[21] Appl. No.: 711,806

[52] U.S. Cl. .................. 428/159; 427/258; 428/203; 428/164; 428/213; 428/315
[51] Int. Cl.² ............... B32B 3/00; B32B 3/26; B32B 31/06
[58] Field of Search ........ 428/158, 159, 164, 203, 428/212–215, 310, 315; 427/258

[56] References Cited

UNITED STATES PATENTS

| | | | |
|---|---|---|---|
| 3,905,849 | 9/1975 | Bomboire | 428/159 |
| 3,931,429 | 1/1976 | Austin | 428/158 |
| 3,978,258 | 8/1976 | Faust et al. | 428/159 |

*Primary Examiner*—William J. Van Balen
*Attorney, Agent, or Firm*—Walter C. Kehm; Joshua J. Ward

[57] ABSTRACT

Decorative sheet type covering material and process for making same. The material has a substrate, a foamed vinyl plastic layer over the substrate, a thin unfoamed smooth plastic layer over the foamed layer, a metal layer over the smooth layer and a wear layer over the metal layer.

21 Claims, 1 Drawing Figure

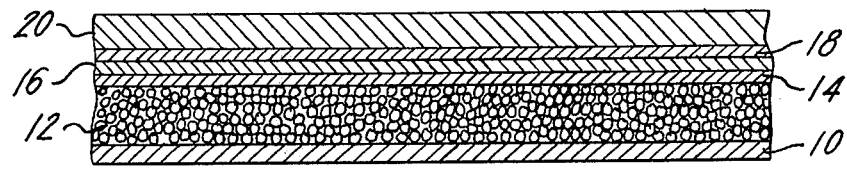

SHEET TYPE COVERING MATERIAL WITH METALLIC LUSTER AND PROCESS FOR MAKING SAME

BACKGROUND OF THE INVENTION

This invention relates to decorative sheet type covering material and to a method for preparing such material.

Decorative sheet type covering materials such as vinyl floor and wall coverings are well known and various attempts have previously been made to impart various decorative effects such as three dimensional and metallic effects to such materials. U.S. Pat. No. 3,458,337 to Rugg for instance suggests a method for producing a textured surface by applying a resin layer containing a catalyst activated foaming agent and then applying in selected pattern areas an agent for suppressing the catalytic action of the catalyst. U.S. Pat. No. 3,293,094 to Nairn et al also makes use of a chemical inhibitor to control the extent of foaming which takes place on various portions of the material. Mechanical embossing has also been used to obtain three dimensional effects as described for instance in U.S. Pat. Nos. 3,741,851 to Erb et al., and 3,887,678 to Lewicky. Layers of metal have also been used to obtain decorative effects as described for instance in U.S. Pats. Nos. 3,345,234 to Jecker et al., 3,518,153 to Slosberg et al., and 3,180,779 to Conger et al. The disclosures of all of the above mentioned U.S. patents are incorporated herein by reference.

SUMMARY OF THE INVENTION

It is an object of the invention to provide decorative sheet type covering material such as sheet vinyl floor covering product having unique decorative effects due to the use of a layer of metal in forming the product.

In accordance with the invention a decorative sheet type covering material is provided which comprises a substrate, a foamed vinyl plastic layer adhered to said substrate, an unfoamed smooth plastic layer comprising cured polyvinyl chloride (PVC) plastisol or organosol adhered to said foamed layer, a metal layer adhered to said smooth layer and a wear layer comprising polyurethane or PVC plastisol or organosol over the metal layer.

The process of the invention comprises first forming a gelled layer of foamable vinyl plastic on a substrate. A thin layer of non-foamable PVC plastisol or organosol is then adhered to the gelled foamable layer and in turn gelled, following which a continuous metal layer is applied to the gelled nonfoamable layer. A wear layer is added and the entire sheet cured to cure the various plastic layers (including fusing of PVC plastisol and organosol) and expand the foamable layer. In a preferred embodiment the continuous metal layer is not supported and is thin enough so that when the foamable layer is expanded the metal layer breaks up to give a unique appearance to the finished product.

BRIEF DESCRIPTION OF THE DRAWING

The FIG. is a fragmentary sectional view through a preferred floor covering material of the invention. In this view it is not intended that the thicknesses of the various layers of the product shown are precisely represented, rather the various layers are represented on a considerably enlarged scale and without showing precise relationships between the thicknesses of the layers.

DETAILED DESCRIPTION OF THE INVENTION

As mentioned above the preferred product of the invention is a decorative sheet type covering material comprising a substrate, a foamed vinyl plastic layer adhered to the substrate, an unfoamed smooth plastic layer of cured PVC plastisol or organosol adhered to the foamed layer, a metal layer over the smooth layer and a cured polyurethane or PVC plastisol or organosol wear layer.

The substrate may include any suitable supporting material such as asbestos felt, a nonwoven or woven fibrous web, a plastisol layer, plastisol on felt backing etc. While almost any flexible substrate may be used, the preferred substrate is felt, most advantageously an impregnated asbestos felt or a resin impregnated cellulose or other organic felt or, with suitable sealing coats, an asphalt saturated organic felt. While felt is preferred, paper, sheet cloth or even metal foil may be used for some purposes such as wall coverings.

The use of a sealing or priming coat on the substrate is not considered essential but is preferred, especially where a felt base is used. Where used, the sealing or priming coat may be made up of a latex, for example a latex containing an acrylic polymer with or without pigment fillers such as the prime coat described in the above mentioned U.S. Pat. No. 3,458,337.

The foamed vinyl plastic layer of the invention may be any of the chemically foamed vinyl plastics conventionally used in the manufacture of sheet vinyl floor products. Such plastics include for instance, those described in the above mentioned U.S. Pat. Nos. 3,458,337 and 3,293,094. For preferred embodiments of the invention the foamed vinyl plastic layer comprises cured PVC plastisol or organosol. Conventional blowing agents, stablizers, catalysts, etc. may be used as taught by the above mentioned patents.

In accordance with the invention an unfoamed smooth plastic layer of vinyl plastic is adhered to the upper surface of the foamed layer in order to insure good adhesion of the subsequently applied metal layer and to provide a suitable base for any printing or other decorating which may be used as described hereinafter. Preferred materials for the unfoamed smooth layer include conventional PVC plastisols or organosols such as those described in the above mentioned U.S. patents.

The metal layer of the invention may be supported or unsupported and may be applied in any suitable manner such as described for instance in the above U.S. Pat. Nos. 3,518,153, 3,345,234 or 3,180,779. Supported layers of metal may conveniently be applied, for instance by lamination onto the smooth unfoamed plastic layer of a conventional layer of metal such as aluminum supported on a conventional plastic base such as polyester. Alternatively an unsupported metal layer may be applied in any suitable manner such as by the use of the conventional transfer technique described below.

In a preferred embodiment of the invention a coat of non-hazing latex is present over the metal to improve adhesion of the wear layer or decorative ink pattern, etc. to the metal. In general the same latexes are suitable for this purpose as are suitable for providing the sealing coat described above for felt base substrate.

The polyurethane or PVC or organosol wear layer which forms the uppermost layer of the product of the invention may be any conventional wear layer of this type such as those described in the above mentioned U.S. Pat. Nos. 3,458,337 and 3,293,094. Where a polyurethane wear layer is used, it should be adhered to a PVC wear layer rather than directly to the metal layer or to the latex layer which is preferably adhered to the metal layer.

In preferred embodiments of the invention additional decorative effect is obtained by providing a printed design on the latex coat over the metal so that the design shows through the wear layer and by embossing the product either by means of chemical embossing of the foamed layer or mechanical embossing of the entire product. Mechanical embossing is especially suitable where an unsupported metal layer is used. Mechanically embossed product incorporating a support metal layer is not as desirable since mechanical embossing of a supported metal layer tends toward uniform depression of the entire product, resulting frequently in a blistered appearance. Chemical embossing is considered suitable for products incorporating either supported or unsupported metal layers. Where chemical embossing is used, the pattern of suppressant ink is preferably printed onto the thin nonfoamable plastic coat overlying the foamable coat, the nonfoamable coat being sufficiently thin so that the suppressant ink may easily penetrate it into the foamable material. Chemical embossing is a well known process in the art and is described in greater detail, for instance in the above mentioned U.S. Pat. Nos. 3,458,337 and 3,293,094. Likewise, mechanical embossing is well known as described in the above mentioned U.S. Pat. Nos. 3,741,851 and 3,887,678.

While it will be appreciated that thicknesses of the various layers of the products of the invention are not generally considered critical, the preferred embodiments of the invention involve the use of a foamed base coat between about 5 and about 100 mils thick, it being understood that embossed portions may be considerably thinner. The thin nonfoamable coat present over the foamed coat preferably has a thickness of between about 1 and about 4 mils and should not exceed this thickness if suppressant ink is applied over this coat to provide chemical embossing of the foamed base coat. The metal layer is usually less than 1 mil thick and, where the metal layer is supported, the plastic base on which the metal layer is supported is preferably less than about 2 mils thick. In a preferred embodiment of the invention employing a chemically embossed foam coat and an unsupported metal layer, the metal layer is preferably less than about 0.5 mil thick and is discontinuous in nature due to the breaking up of the metal during foaming of the base coat. Such a discontinuous metal coating provides a unique visual appearance unobtainable by other means. The latex coat used over the metal to insure good adhesion of decorative and wear layers is frequently less than about 1 mil thick. PVC wear layers, especially if the material is to be used as flooring, are preferably at least about 4 mils thick, more usually from about 7 to about 20 mils or more in thickness, to provide suitable durability. Polyurethane wear layers are preferably about 1 and about 5 mils thick.

As mentioned above, the basic process of the invention involves adhering a layer of foamable vinyl plastic to a substrate followed by gelling of the foamable layer and the adhering to the foamable layer of a nonfoamable layer of PVC plastisol or organosol which is in turn gelled. The continuous metal layer is then applied to the gelled nonfoamable layer and the wear layer is applied over the metal layer after which the entire sheet is heated to a sufficient temperature to cure the plastic layers and expand and cure the foamable layer. Preferred embodiments of the process include use of chemical embossing by printing a suppressant ink on the gelled nonfoamable layer adhered to the foamable layer, the use of a coat of latex over the metal to insure adhesion of decorative printing or wear layer to the metal and the use of a decorative printed layer over the latex coat immediately under the wear layer. In addition, other conventional decorative effects may be used such as printing of the wear layer, use of decorative chips in the wear layer, mechanical embossing of the finished product etc.

The various layers of the product of the invention may be formed in any conventional manner. For instance, the use of knife coaters is generally preferred in placing the foamable coating on the substrate. In this respect, the foamable coating as applied is usually applied in a thickness of between about 2 and about 30 mils. Knife coaters may also be used for other layes of the invention such as the wear layer. In preferred embodiments of the invention, the layer of non-foamable plastic adhered to the layer of foamable plastic is sufficiently thin so that the use of knife coaters is not generally preferred. For application of this layer the use of a conventional wire coater or reverse roll coater is preferred. Printed layers of suppressant ink or decorative ink may be applied in a conventional manner such as by the use of conventional rotograuvre equipment. The layer of latex applied to the metal layer in accordance with the preferred embodiment of the invention may likewise be applied by suitable means such as direct roll coating.

The metal layer itself may be applied in any suitable manner. In preferred embodiments of the invention, however, the metal layer is preferably applied by lamination if it is supported and by means of a transfer material if it is unsupported. Unsupported metal may, for instance, be applied by the use of conventional metallized transfer media such as a standard polyester transfer film supporting layers of acrylic release coating, condensed metal and thermoplastic adhesive. The adhesive, metal film and acrylic coating are transferred to the substrate by passing the transfer media and substrate through a hot pressure nip followed by stripping of the polyester film.

One of the unique visual effects obtainable by the process of the invention is obtained in the preferred embodiment of the invention wherein the metal layer is deposited by the transfer technique described above and is sufficiently thin, i.e. less than about 0.5 mil, so that when the foamable plastic layer is expanded, the metal layer (which is continuous when applied) is broken up by the pressure of the expanding plastic to provide a discontinuous metal layer covering and providing a completely unique visual appearance.

Operating conditions used in applying the metal layer by the preferred transfer technique described above are those normal to application of metal to substrates by such transfer techniques.

In general the temperatures and residence times used in gelling and curing the various plastic layers of the invention and in expanding the foamable layer are in accordance with conventional practice in the industry. Suitable gelling conditions frequently include, for instance, temperatures between about 150° and 350° F to which the layer being gelled is subjected for a time between 0.1 and about 5 minutes. Likewise, suitable temperatures for curing curable layers and foaming and curing the expandable foam layer frequently include temperatures between about 300° and about 450° F and residence times of between 1 and about 5 minutes.

For a further understanding of the invention reference may be had to the drawing which illustrates a typical product of the invention having a substrate 10, foamed vinyl plastic layer 12, unfoamed smooth PVC layer 14, metal layer 16, printed latex layer 18 and PVC wear layer 20.

EXAMPLE

This example illustrates a suitable method for preparing a product such as that depicted in drawing by the process of the invention. In making this particular product a 28 mil thick asbestos felt sheet was coated with a latex seal coat to provide improved vinyl adhesion and permeability to plasticizers. The seal coat was an acrylic water emulsion of approximately 25 weight percent solids consisting of 35–40% ethyl acrylate and 60–65% methyl methacrylate. The foamable base coat containing catalyst and blowing agent was then applied with a knife edge coater at a thickness of 11 mils and gelled for 3 minutes at 275° F in an oven. The foamable base coat had the following composition:

| Ingredients | Parts by Weight |
| --- | --- |
| PVC homopolymer dispersion resin | 50 |
| PVC homopolymer suspension resin | 50 |
| 2,2,4 trimethyl pentanediol isobutyrate benzoate | 56 |
| Epoxidized soya oil | 6 |
| Zinc-cadmium catalyst | 2.5 |
| Azodicarbonamide | 2.5 |
| Titanium dioxide | 7.5 |

Following gelling of the foamable base coat, a 2–3mil nonfoamable smooth coat of vinyl plastic was coated onto the base coat with a wire coater and gelled on a hot drum pressure nip at a temperature of 300° F. at 35 lbs per linear inch pressure. The smooth coat had the following composition:

| Ingredients | Parts by Weight |
| --- | --- |
| PVC homopolymer dispersion | 100 |
| 2,2,4 trimethyl pentanediol isobutyrate benzoate | 60 |
| Texanol isobutyrate | 4 |
| Light stabilizer | 11 |
| Mineral spirits | 6 |
| Alkylphenylether of polyethylene glycol | 0.6 |

A block type pattern was then printed onto the above smooth coat by conventional techniques using a clear suppressant ink. Using a standard metallized transfer material, the adhesive, metal layer (aluminum) and release coating were transferred from a polyester carrier to the smooth coat in a hot pressure nip at 300° F, 35 lbs per linear inch pressure and a line speed of 35 feet per minute. A second design was then printed on the metal layer in register with the printing below the metal layer using ordinary, non-suppressant inks. A 10 mil thick top coat (wear layer) was then applied followed by heating of the entire sheet for 2¾ minutes in a tunnel oven with the first zone at 350° F and the second zone at 370° F to expand the foamable layer and cure the sheet. The wear layer used had the following composition:

| Ingredients | Parts by Weight |
| --- | --- |
| PVC/PVAC copolymer dispersion resin | 100 |
| 2,2,4 trimethyl isobutyrate benzoate | 56 |
| Light stabilizer | 11 |
| Mineral spirits | 2 |
| Alkylphenyl ether of polyethylene glycol | 0.6 |

The completed product was an embossed vinyl coated product having a highly desirable reflective metal finish of unique appearance in which the metal layer, which was continuous when applied, was broken up during expansion of the foamable base coat to provide in the finished product a randomly broken discontinuous metal layer.

While the invention has been described with respect to preferred embodiments thereof, it will be understood by those skilled in the art that various changes and modifications may be made without departing from the spirit or scope of the invention.

What we claim is:

1. Decorative sheet type covering material comprising:
    a. a substrate;
    b. a foamed vinyl plastic layer adhered to said substrate;
    c. an unfoamed smooth plastic layer of cured PVC plastisol or organosol adhered to said foamed layer;
    d. a metal layer adhered to said smooth layer; and
    e. a wear layer comprising cured polyurethane or cured PVC plastisol or organosol over said metal layer.

2. Material according to claim 1 in which the metal layer is continuous.

3. Material according to claim 1 in which the metal layer is discontinuous.

4. Material according to claim 1 in which the foamed layer is chemically embossed.

5. Material according to claim 3 in which the completed product is mechanically embossed.

6. Material according to claim 1 in which a layer of cured latex is adhered to the metal layer under the wear layer.

7. Material according to claim 6 including a decorative design printed on the latex layer adhered to the metal coat.

8. Material according to claim 1 in which the substrate comprises asbestos felt having a latex seal coat.

9. Decorative sheet type covering material comprising:
    a. a seal coated asbestos felt substrate;
    b. a chemically foamed layer of cured PVC plastisol or organosol ahdered to said substrate, said foamed layer being between about 5 and about 100 mils thick in its unembossed portions;
    c. an unfoamed smooth layer of cured PVC plastisol or organosol between about 1 and about 4 mils thick adhered to said foamed layer;
    d. a discontinuous layer of metal less than about 0.5 mil thick adhered to said smooth layer.
    e. a layer of cured latex less than about 1 mil thick adhered to said metal layer and having a decorative design printed thereon; and
    f. a wear layer between about 7 and about 20 mils thick adhered to said latex coated metal layer, said wear layer comprising cured PVC plastisol or organosol.

10. Material according to claim 9 wherein a second wear layer of cured polyurethane between about 1 and about 5 mils thick is adhered to the PVC wear layer.

11. A process for making decorative sheet type covering material which comprises the steps of:
   a. adhering a foamable layer of vinyl plastic to a substrate and gelling said layer;
   b. adhering a nonfoamable layer of PVC plastisol or organosol to said foamable layer and gelling the nonfoamable layer;
   c. applying continuous metal layer over the gelled nonfoamable layer;
   d. applying a wear layer comprising polyurethane or PVC plastisol or organosol over the metal layer; and
   e. heating the material sufficiently to expand the foamable layer and cure the foamed layer, the nonfoamable layer and the wear layer.

12. A process according to claim 11 wherein a latex layer is applied to the metal layer prior to application of the wear layer.

13. A process according to claim 12 wherein a decorative design is printed on the latex layer prior to application of the wear layer.

14. A process according to claim 11 wherein the metal layer is unsupported, whereby the metal layer breaks up into a discontinuous layer upon expansion of the foamable layer.

15. A process according to claim 11 wherein the metal layer is supported on plastic backing, whereby the metal layer does not break up upon expansion of the foamable layer.

16. A process according to claim 11 wherein the non foamable layer adhered to the foamable layer is between about 1 and about 4 mils thick and a pattern of suppressant ink is applied to said non foamable layer and penetrates such layer and at least partially into the foamable layer, whereby upon expansion of the foamable layer the foamable layer is chemically embossed.

17. A process according to claim 11 further including mechanically embossing the finished product.

18. A process according to claim 11 in which the layer of foamable vinyl plastic comprises PVC plastisol or organosol and blowing agent.

19. A process for making decorative sheet type covering material which comprises:
   a. adhering a layer between about 2 and about 30 mils thick of foamable plastic comprising PVC plastisol or organosol and blowing agent to a substrate comprising seal coated asbestos felt and gelling said foamable layer at a temperature between about 150° and about 350° F for a time between about 0.1 and about 5 minutes;
   b. adhering a smooth nonfoamable layer of PVC plastisol or organosol between about 1 and about 4 mils thick to the foamable layer and gelling the nonfoamable layer at a temperature between about 150° and about 350° C for a time between about 0.1 and about 5 minutes;
   c. applying a pattern of suppressant ink to the gelled nonfoamable layer whereby the suppressant ink penetrates through said non foamable layer and into the foamable layer;
   d. applying a continuous unsupported metal layer less than about 0.5 mil thick to the non foamable layer;
   e. applying a smooth layer of latex less than about 1 mil thick to the metal layer and dring said latex layer;
   f. applying a printed ornamental design to the surface said latex layer;
   g. applying a wear layer between about 7 and about 20 mils thick comprising PVC plastisol or organosol over said printed latex layer; and
   h. curing the material at a temperature between about 300° and about 450° F for a time between about 1 and about 5 minutes to thereby cure the wear layer and nonfoamable layer and expand and cure the foamable layer.

20. Decorative sheet type covering material produced according to the process of claim 11.

21. Decorative sheet type covering material produced according to the process of claim 19.

* * * * *